United States Patent [19]
O'Brien et al.

[11] Patent Number: 5,316,988
[45] Date of Patent: May 31, 1994

[54] SIALON CERAMIC COMPOSITIONS AND METHODS OF FABRICATION

[75] Inventors: Michael H. O'Brien; Blair H. Park, both of Idaho Falls, Id.

[73] Assignee: EG&G Idaho, Inc., Idaho Falls, Id.

[21] Appl. No.: 100,888

[22] Filed: Aug. 2, 1993

[51] Int. Cl.$^5$ ............................................ C04B 35/58
[52] U.S. Cl. ........................................ 501/98; 501/96; 264/66
[58] Field of Search ................ 501/96, 97, 98; 264/66

[56] References Cited

U.S. PATENT DOCUMENTS

| | | | |
|---|---|---|---|
| 4,323,323 | 4/1982 | Lumby et al. | 501/98 |
| 4,506,020 | 3/1985 | Butler et al. | 501/98 |
| 4,506,021 | 3/1985 | Jack et al. | 501/98 |
| 4,748,138 | 5/1988 | Watanabe et al. | 501/96 |
| 4,804,644 | 2/1989 | Anseau et al. | 501/98 |
| 4,866,013 | 9/1989 | Anseau et al. | 501/98 |
| 4,935,389 | 6/1990 | Umebayashi et al. | 501/98 |
| 5,023,216 | 6/1991 | Anseau et al. | 501/98 |
| 5,032,553 | 7/1991 | Tarry | 501/97 |

Primary Examiner—Mark L. Bell
Assistant Examiner—Deborah Jones
Attorney, Agent, or Firm—Wells, St. John, Roberts, Gregory & Matkin

[57] ABSTRACT

A method of fabricating a SiAlON ceramic body includes: a) combining quantities of $Si_3N_4$, $Al_2O_3$ and $CeO_2$ to produce a mixture; b) forming the mixture into a desired body shape; c) heating the body to a densification temperature of from about 1550° C. to about 1850° C.; c) maintaining the body at the densification temperature for a period of time effective to densify the body; d) cooling the densified body to a devitrification temperature of from about 1200° C. to about 1400° C.; and e) maintaining the densified body at the devitrification temperature for a period of time effective to produce a $\beta'$-SiAlON crystalline phase in the body having elemental or compound form Ce incorporated in the $\beta'$-SiAlON crystalline phase. Further, a SiAlON ceramic body comprises: a) an amorphous phase; and b) a crystalline phase, the crystalline phase comprising $\beta'$-SiAlON having lattice substituted elemental or compound form Ce.

23 Claims, No Drawings

SIALON CERAMIC COMPOSITIONS AND METHODS OF FABRICATION

CONTRACTUAL ORIGIN OF THE INVENTION

The United States Government has rights in this invention pursuant to Contract No. DE-AC07-76ID01570 between the U.S. Department of Energy and EG&G Idaho, Inc.

TECHNICAL FIELD

This invention relates to SiAlON ceramic compositions and to methods of fabricating SiAlON ceramic compositions.

BACKGROUND OF THE INVENTION

Engineering ceramics are non-metallic, inorganic materials, such as oxides, nitrides and carbides of the metals silicon, aluminum, boron and zirconium. Starting materials for such compositions typically require high temperature processing at above 500° C. to achieve desired densification and desired finished product characteristics. These characteristics include great strength, hardness and substantial chemical inertness which are retained to temperatures in excess of 1000° C.

One type of ceramic includes the SiAlON family, which is characterized by inclusion of the elements Si, Al, O and N. One example SiAlON is $\beta'$-SiAlON which has a crystal structure like $\beta$-$Si_3N_4$, but having some of the silicon atoms replaced by aluminum atoms, and for valency balance, nitrogen atoms replaced by oxygen atoms. Because of their light weight and high resistance to temperature and corrosion, silicon nitride and related composites such as SiAlONs have the potential to be substituted for superalloys containing strategic and critical materials.

The SiAlONs are usually formed by first mixing $Si_3N_4$, $Al_2O_3$, $SiO_2$, and another metal oxide such as $Y_2O_3$ into a powder mixture. The powder mixture is compacted or otherwise formed into a desired shape, and then fired at approximately 1750° C. for a few hours. The function of the added metal oxide is to react with the alumina and silica (which is present on the surface of each silicon nitride particle) to form a liquid phase which dissolves the reactants and precipitates the product. $Y_2O_3$ also functions as a sintering aid which when present in sufficient quantity enables pressureless sintering.

The liquid phase (which still contains dissolved nitrides), cools to form an amorphous glass. The result is a homogenous solution of glass having $\beta'$-SiAlON grains dispersed throughout. Typically, a $Y_2O_3$ densified $\beta'$-SiAlON contains about 15% by volume of Y-SiAlON glass and 85% by volume $\beta'$-SiAlON grains.

SiAlONs can also be formed in a $Si_2N_2O$ phase, commonly referred to as O'-SiAlON. Such is typically represented as $Si_{2-x}Al_xO_{1+x}N_{2-x}$. $\beta'$-SiAlON is commonly described with the general formula $Si_{6-z}Al_zO_zN_{8-z}$, where solid solution exists for $0 \leq z \leq 4.2$. O'-SiAlON offers improved resistance to oxidation at elevated temperatures, while $\beta'$-SiAlON possesses mechanical strength similar to $\beta$ silicon nitride.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with one aspect of the invention, a method of fabricating a SiAlON ceramic body comprises:

combining quantities of $Si_3N_4$, $Al_2O_3$ and $CeO_2$ to produce a mixture;

forming the mixture into a desired body shape;

heating the body to a densification temperature of from about 1550° C. to about 1850° C.;

maintaining the body at the densification temperature for a period of time effective to densify the body;

cooling the densified body to a devitrification temperature of from about 1200° C. to about 1400° C.; and maintaining the densified body at the devitrification temperature for a period of time effective to produce a $\beta'$-SiAlON crystalline phase in the body having elemental or compound form Ce incorporated in the $\beta'$-SiAlON crystalline phase.

In accordance with another aspect of the invention, a SiAlON ceramic body comprises:

an amorphous phase; and a crystalline phase, the crystalline phase comprising $\beta'$-SiAlON having lattice substituted elemental or compound form Ce.

In accordance with the method of the invention, $Si_3N_4$ is preferably present in the mixture at from 55% to 99% by weight, $Al_2O_3$ is present in the mixture at from 0.1% to 26% by weight, and $CeO_2$ is present in the mixture at from 2% to 20% by weight. More preferably, $Si_3N_4$ is present in the mixture at from 55% to 72% by weight, $Al_2O_3$ is present in the mixture at from 10% to 13% by weight, and $CeO_2$ is present in the mixture at from 6% to 10% by weight.

Even more preferably, the mixture of the inventive method further comprises $SiO_2$. In such circumstances, $Si_3N_4$ is preferably present in the mixture at from 55% to 99% by weight, $SiO_2$ is present in the mixture at from 0.1% to 25% by weight, $Al_2O_3$ is present at from 0.1% to 26% by weight, and $CeO_2$ is present in the mixture at from 1% to 20% by weight. Most preferably, $Si_3N_4$ is present in the mixture at from 55% to 72% by weight, $SiO_2$ is present in the mixture at from 1% to 25% by weight, $Al_2O_3$ is present at from 10% to 13% by weight, and $CeO_2$ is present in the mixture at from 6% to 13% by weight.

The preferred densification or sintering temperature is from 1600° C. to 1650° C. A preferred devitrification temperature is 1350° C. Preferably, the effective period of time at the devitrification temperature is at least about 5 minutes, with from about 5 minutes to 2 hours expected to be adequate.

Cerium dioxide ($CeO_2$) is a known sintering aid for creating many varied ceramic composites. $CeO_2$ in the context of this invention also functions as a sintering aid. However, it has been discovered that by cooling the densified body to a devitrification temperature within the recited range, and maintaining that body at that temperature for an effective period of time, results in cerium incorporation physically into the $\beta'$-SiAlON crystal grains.

Elemental cerium tends towards the 4+ oxidation state in air below approximately 1600° C. Many other rare earth sesquioxides all form several stable silicates and aluminates which would typically be undesirable to be present in a finished densified ceramic body. It has been discovered that cerium SiAlONs devitrified at between 1200° C. and 1400° C. contain negligible cerium aluminates or silicates, unless the atmosphere was a highly reducing atmosphere. Such in part facilitates incorporation of cerium, either in elemental or compound form, physically into $\beta'$-SiAlON grains. Incorporation of cerium into the $\beta'$-SiAlON crystal phase in the above manner is highly desirable as such fundamentally increases or maximizes the quantity of $\beta'$-SiAlON crystal grains, and correspondingly increases the ratio of the crystal to glass phase in the finished ceramic. Cerium might be present in the crystal lattice either in the elemental $Ce^{+4}$ formed, or in a compound form of $CeO_2$.

A preferred ceramic body in accordance with the invention will produce a glassy, amorphous phase constituting only from about 5% to 10% by volume of the body. Further, additional crystalline phases might be present, such as O'-SiAlON, depending upon process conditions. For combination of O'-SiAlON and $\beta'$-SiAlON having incorporated cerium is utilized, the O'-SiAlON phase will typically be from about 0.1% to 80% of the body by volume, with the $\beta'$-SiAlON phase constituting 15% to 95% of the body by volume. Preferably, the elemental or compound form Ce will be substituted in at least 50% of the $\beta'$-SiAlON grains present in the body.

In reducing the invention to practice, reactive materials of fumed (high surface area) $SiO_2$ (Cab-O-Sil L-90 from Cabot Corporation of Tuscola, Ill.), $Si_3N_4$ (UBE-SM-E-10 from UBE Industries America, Inc. of New York, N.Y.), alumina (Cerac 99.99% $Al_2O_3$ A-1124 −325 mesh from Cerac of Milwaukee, Wis.) and $CeO_2$ (Cerac 99.9% $CeO_2$ s#-x13019 −325 Mesh from Cerac of Milwaukee, Wis.) were the materials of choice. Utilizing silicon nitride material having maximized surface area is desirable because silicon nitride's otherwise sluggish inter-diffusion and dissolution. Examples using other more common silicon nitride sources produced less than desirable results.

It was determined that the resultant composition's quantity of O'-SiAlON versus $\beta'$-SiAlON was determinable mostly entirely by the single component variable of $SiO_2$ quantity in the pre-sintering mixture. Six batch compositions were made. The molar fraction of each component of the composition is described by the following expressions:

For Composition
Ce2; $\phi = .1516$    Ce5; $\phi = .5105$
Ce3; $\phi = .63$       Ce6; $\phi = .2715$
Ce4; $\phi = .391$      Ce7; $\phi = .0321$ Mole fraction $SiO_2 = \dfrac{\phi}{\phi + .8483}$ Mole fraction $Si_3N_4 = \dfrac{.6079}{\phi + .8483}$ Mole fraction $Al_2O_3 = \dfrac{.1503}{\phi + .8483}$ Mole fraction $CeO_2 = \dfrac{.0901}{\phi + .8483}$ Composition Ce3 was approximately pure O'-SiAlON, while Ce7 was nearly all $\beta'$-SiAlON. When this line is projected upon the SiAlON plane ($SiO_2$-$Si_3N_4$-AlN-$Al_2O_3$), these compositions fall within a compatibility triangle of $Si_3N_4$-$\beta'_{(z<1)}$-O'. These low Al-O substitution compositions provide good composite properties. In producing the above compositions, starting powders were mixed in isopropanol and ball milled in an alumina media for 24 hours. The $Al_2O_3$ contributed by the media was negligible relative to the $Al_2O_3$ content of the starting mixture. After drying, pellet and bar-shaped samples were pressed uniaxially to pressures just sufficient to allow handling. Samples were sealed in evacuated thin-latex probe covers (condoms) and cold isostatically pressed at 207 MPa (30 ksi).

Samples were liquid phase sintered in a graphite resistance furnace in flowing nitrogen. A minimum of a 30 minute nitrogen purge preceded heating. Samples were buried in a buffer powder and enclosed in boron nitride containers bearing lids. The buffer powder consisted of a 1:1 weight ratio of coarse $Si_3N_4$ and $SiO_2$ with 20 weight % BN powder added as a release agent. Such facilitates controlling silicon monoxide (SiO), silicon subnitrides and nitrogen partial pressures at the sample surface.

Three-stage firing cycles were employed on the samples. A first temperature hold occurred at moderate temperatures (1400–1500° C.) for 30 minutes. This stage allowed the first liquids to form and some densification to occur due to particle rearrangement and capillary forces. In a stage two, at 1575° C. to 1625° C. for one to two hours, particle dissolution and reprecipitation resulted in high relative density bodies having glassy (liquid at temperature) matrices. In a third cooler devitrification stage, the samples were held for one-hour at 1350° C., which is slightly below the oxide ternary eutectic of about 1370° C. In this stage, a significant amount of devitrification occurred with physical incorporation of cerium into the $\beta'$-SiAlON crystal phase.

The $\beta'$-SiAlON materials in accordance with the invention are similar in strength and toughness to many commercially sintered nitride products. Toughness values of the inventive materials varied between 3 to 5 MPa m and flexural strengths (4 point bend) between 300 and 600 MPa at room temperature. Strength and toughness values increased with increasing temperature up to approximately 1100° C. The cerium doped $\beta'$-SiAlON materials of the invention were also discovered to have lower oxidation rates at higher temperatures than other SiAlONs and Y or Mg doped nitrides. In addition, higher retained strengths and damage resistances after oxidation over Y or Mg doped nitrides were also shown.

The above compositions might of course be stabilized with other materials, such as zirconia, or include other reinforcing materials, such as SiC. Where zirconia is used, the pre-sinter mixture inclusion of $CeO_2$ will also stabilize the formed zirconia phase in the finished body.

In compliance with the statute, the invention has been described in language more or less specific as to structural, compositional and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of fabricating a SiAlON ceramic body comprising:
   combining quantities of $Si_3N_4$, $Al_2O_3$ and $CeO_2$ to produce a mixture;
   forming the mixture into a shape;

heating the body to a densification temperature of from about 1550° C. to about 1850° C.;

maintaining the body at the densification temperature for a period of time effective to densify the body;

cooling the densified body to a devitrification temperature of from about 1200° C. to about 1400° C.; and maintaining the densified body at the devitrification temperature for a period of time effective to produce a $\beta'$-SiAlON crystalline phase in the body having elemental or compound form Ce incorporated in the $\beta'$-SiAlON crystalline phase.

2. The method of fabricating a SiAlON ceramic body of claim 1 wherein $Si_3N_4$ is present in the mixture at from 55% to 99% by weight, $Al_2O_3$ is present in the mixture at from 0.1% to 26% by weight, and $CeO_2$ is present in the mixture at from 2% to 20% by weight.

3. The method of fabricating a SiAlON ceramic body of claim 1 wherein $Si_3N_4$ is present in the mixture at from 55% to 72% by weight, $Al_2O_3$ is present in the mixture at from 10% to 13% by weight, and $CeO_2$ is present in the mixture at from 6% to 10% by weight.

4. The method of fabricating a SiAlON ceramic body of claim 1 wherein the mixture further comprises $SiO_2$.

5. The method of fabricating a SiAlON ceramic body of claim 1 wherein the mixture further comprises $SiO_2$; and wherein $Si_3N_4$ is present in the mixture at from 55% to 99% by weight, $SiO_2$ is present in the mixture at from 0.1% to 25% by weight, $Al_2O_3$ is present in the mixture at from 0.1% to 26% by weight, and $CeO_2$ is present in the mixture at from 1% to 20% by weight.

6. The method of fabricating a SiAlON ceramic body of claim 1 wherein the mixture further comprises $SiO_2$; and wherein $Si_3N_4$ is present in the mixture at from 55% to 72% by weight, $SiO_2$ is present in the mixture at from 1% to 25% by weight, $Al_2O_3$ is present in the mixture at from 10% to 13% by weight, and $CeO_2$ is present in the mixture at from 6% to 13% by weight.

7. The method of fabricating a SiAlON ceramic body of claim 1 wherein the period of time at the devitrification temperature is at least about 5 minutes.

8. The method of fabricating a SiAlON ceramic body of claim 1 wherein the period of time at the devitrification temperature is from about 5 minutes to 2 hours.

9. The method of fabricating a SiAlON ceramic body of claim 1 wherein the devitrification temperature is about 1350° C. and the period of time at the devitrification temperature is about 30 minutes.

10. The method of fabricating a SiAlON ceramic body of claim 1 wherein, $Si_3N_4$ is present in the mixture at from 55% to 99% by weight, $Al_2O_3$ is present in the mixture at from 0.1% to 26% by weight, and $CeO_2$ is present in the mixture at from 2% to 20% by weight; and the period of time at the devitrification temperature is at least about 5 minutes.

11. The method of fabricating a SiAlON ceramic body of claim 1 wherein, wherein $Si_3N_4$ is present in the mixture at from 55% to 72% by weight, $Al_2O_3$ is present in the mixture at from 10% to 13% by weight, and $CeO_2$ is present in the mixture at from 6% to 10% by weight; and the period of time at the devitrification temperature is at least about 5 minutes.

12. The method of fabricating a SiAlON ceramic body of claim 1 wherein, the mixture further comprises $SiO_2$;

$Si_3N_4$ is present in the mixture at from 55% to 99% by weight, $SiO_2$ is present in the mixture at from 0.1% to 25% by weight, $Al_2O_3$ is present in the mixture at from 0.1% to 26% by weight, and $CeO_2$ is present in the mixture at from 1% to 20% by weight; and the period of time at the devitrification temperature is at least about 5 minutes.

13. The method of fabricating a SiAlON ceramic body of claim 1 wherein, the mixture further comprises $SiO_2$;

$Si_3N_4$ is present in the mixture at from 55% to 72% by weight, $SiO_2$ is present in the mixture at from 1% to 25% by weight, $Al_2O_3$ is present in the mixture at from 10% to 13% by weight, and $CeO_2$ is present in the mixture at from 6% to 13% by weight; and the period of time at the devitrification temperature is at least about 5 minutes.

14. The method of fabricating a SiAlON ceramic body of claim 1 wherein the Ce incorporated in the $\beta'$-SiAlON crystalline phase is substituted in the crystalline lattice thereof is elemental $Ce^{+4}$.

15. The method of fabricating a SiAlON ceramic body of claim 1 wherein the Ce incorporated in the $\beta'$-SiAlON crystalline phase is substituted in the crystalline lattice thereof is $CeO_2$.

16. A SiAlON ceramic body comprising:

an amorphous phase; and a crystalline phase, the crystalline phase comprising $\beta'$-SiAlON having lattice substituted elemental or compound form Ce.

17. The SiAlON ceramic body of claim 16 wherein the amorphous phase is from 5% to 10% by volume of the body.

18. The SiAlON ceramic body of claim 16 comprising multiple crystalline phases, at least one of which is $O'$-SiAlON.

19. The SiAlON ceramic body of claim 16 comprising multiple crystalline phases, at least one of which is $O'$-SiAlON, the $O'$-SiAlON phase being from 0.1% to 80% of the body by volume, the $\beta'$-SiAlON phase being from 15% to 95% of the body by volume.

20. The SiAlON ceramic body of claim 16 comprising multiple crystalline phases, at least one of which is $O'$-SiAlON, the $O'$-SiAlON phase being from about 0.1% to 80% of the body by volume, the $\beta'$-SiAlON phase being from about 15% to 95% of the body by volume, and the amorphous phase being from about 5% to 10% of the body by volume.

21. The SiAlON ceramic body of claim 16 wherein the lattice substituted elemental or compound form Ce is substituted in at least 50% of the $\beta'$-SiAlON grains in the body.

22. The SiAlON ceramic body of claim 16 wherein the Ce substituted in the crystalline lattice is elemental $Ce^{+4}$.

23. The SiAlON ceramic body of claim 16 wherein the Ce substituted in the crystalline lattice is $CeO_2$.

* * * * *